Dec. 15, 1931.  O. SPORRI  1,836,625
PLOW HITCH
Filed May 20, 1930
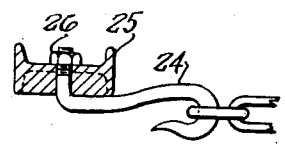
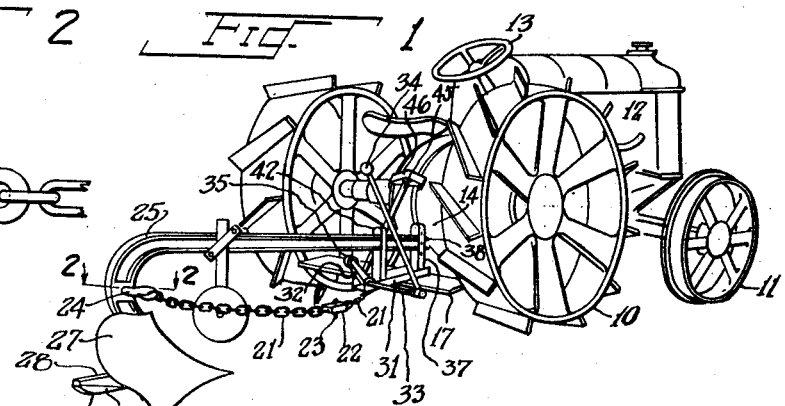
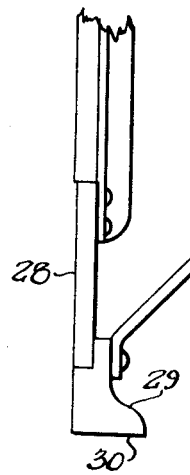
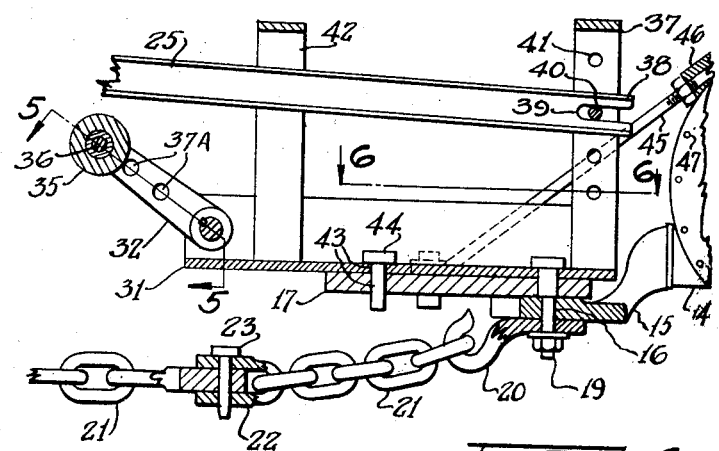
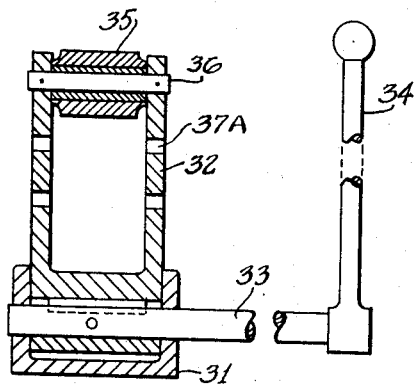
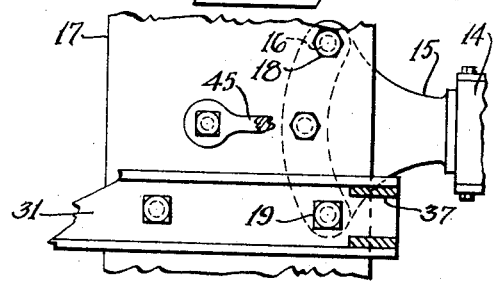
INVENTOR
O. SPORRI
ATTORNEY Patented Dec. 15, 1931

1,836,625

UNITED STATES PATENT OFFICE

OSCAR SPORRI, OF MILWAUKIE, OREGON

PLOW HITCH

Application filed May 20, 1930. Serial No. 453,936.

This invention relates generally to plows for turning the soil, and particularly to a hitch for attaching same to a tractor.

The main object of this invention is to provide a hitch between a plow and tractor whereby the utmost amount of flexibility is maintained.

The second object is to provide a hitch for a plow which will not cause the plow to run into the ground or out of the ground when the tractor passes over irregularities or obstacles.

The third object is to guide the plow or regulate the depth of plowing by means of the forward end of the beam, but to apply the tractive effort at the rearward end of the beam close to or below the level at which the forward end of the plow beam is supported.

The fourth object is to provide a chain drive mechanism including a breaker element which will prevent injury of the plow and which, in conjunction with the remainder of the device, positively prevents the tractor from over-turning backwardly whenever the plow is stalled.

The fifth object is to construct a plow normally having the utmost lateral and vertical flexibility but capable of assuming a rigid lateral relationship to the tractor for the purpose of plowing out the last furrow of a land without setting the plow to an extra depth.

The sixth object is to construct a plow which will readily adapt itself to use with either right or left hand implements.

These, and other objects, will become more apparent from the specification following as illustrated in the accompanying drawings, in which:

Fig. 1 is a perspective view showing the device coupling a plow to a tractor.

Fig. 2 is a horizontal section taken along the line 2—2 in Fig. 1.

Fig. 3 is a longitudinal section through the device.

Fig. 4 is a rear elevation of the plow.

Fig. 5 is a section taken along the line 5—5 in Fig. 3.

Fig. 6 is a horizontal section taken along the line 6—6 in Fig. 3.

Similar numbers of reference refer to similar parts throughout the several views.

Referring in detail to the drawings, there is shown a common form of tractor including the drive wheels 10, front wheels 11, the engine compartment 12 and the steering wheel 13. From the frame 14 extends in a backward direction the draw bar plate 15 provided with a number of holes 16, to any of which the plow is normally attached, the selection being determined by the draft of the plow being used.

Referring particularly to my device it will be seen to consist of a horizontal plate 17 which is bolted to the draw bar 15 by means of the bolts 18 which occupy the holes 16 which are not occupied by the shouldered draw bar bolt 19, to which is attached a hook 20 which receives the end link of a chain 21 provided with a breaker link 22 whose pin 23 is normally of a material which will shear under an excess load.

The rearmost end of the chain 21 fastens to a hook 24 which is attached to the plow beam 25 by means of a nut 26 close to the top of the mold board 27. The rearmost end of the landside 28 is provided with a heel 29 which is flat on its under side 30 and upturned at its rearmost end, the purpose being to prevent the rear end of the landside 28 from digging into the ground.

Mounted on the plate 17 and normal thereto is a horizontal channel bar 31 whose foremost end is pivotally attached to the bolt 19, enabling the bar 31 to swing laterally under normal conditions. At the rearward end of the bar 31 is mounted a rocker arm 32 on the horizontal shaft 33 which is operated by a hand lever 34. On the upper end of the rocker arm 32 is provided a roller 35 whose shaft 36 may be placed in any one of the holes 37A to provide the desired adjustment for the plow. At the opposite end of the bar 31 is secured an upright support 37 consisting of a flat bar bent downwardly upon itself leaving a slot between the sides thereof into which can be inserted the end 38 of the plow beam 25. The end 38 is provided with a slot 39 which freely receives a pin 40 which may occupy any of the holes 41 which pass horizontally through the member 37.

Between the shaft 33 and the support 37 is placed a guide 42 similar in shape to the support 37 and secured at its lower end to the bar 31. The plow beam 25 is capable of freely moving vertically within the guide 42.

Passing through the bottom of the bar 31 and the plate 17 are the holes 43 which register when the plow is in a correct plowing relationship to the tractor. When plowing out the last furrow, as suggested, a pin 44 is dropped into the holes 43 holding the plow against lateral movement with relation to the tractor.

In order to support the plate 17 an inclined brace rod 45 is provided which attaches same to the cross member 46 whose ends are secured to a differential housing by means of the bolts 47.

The operation of the device is as follows: When starting a land it is necessary to drop the plow beam end 38 down until a furrow is formed, after which the beam end 38 is raised and kept raised until a land is finished. It can be seen that all of the pull required to move the plow through the ground passes through the chain 21 which, owing to its position with relation to the beam 25, tends to hold the plow into the ground. If a root, stone or other obstruction should be encountered the tendency of the tractor to overturn is eliminated by the breaker link 22, which allows the plow to become completely disengaged from the tractor, due to the connection between the pin 40 and the slot 39.

It can be seen from the above that the plow beam 25 is not attached to but is merely guided within a slot formed between the sides of the guide 42 and is hingedly mounted to the support 37, but this part of the connection does not furnish a means for drawing the plow, this operation being performed entirely by the chain which, as stated, is so attached between the plow beam and the tractor that the resulting pull is forwardly and downwardly.

I claim:

1. A plow having a beam and mold board in combination with a bar pivotally attached to the draw bar of a tractor in a manner to permit same to swing in a horizontal plane, said bar having a support at the forward end thereof, a vertical guide at the rearward end thereof adapted to receive the beam of said plow, a chain between the pivotal point of said bar and the under portion of said plow beam, and means for locking said bar against a swinging movement.

2. A hitch for tractors consisting of a plate adapted to be mounted transversely across the draw bar of a tractor, a bolt passing vertically through said draw bar and through said plate, a horizontal bar pivotally attached to the upper end of said bolt and resting on said plate, a perforated vertical support on the top side of said bar near said bolt, a vertically slotted support near the opposite end of said bar, a rocker arm mounted on said bar near said vertical guide, and a chain connection from the bolt in said draw bar having a breaker link therein with means for attaching same to the beam of a plow.

OSCAR SPORRI.